United States Patent [19]
Mauger et al.

[11] 3,764,246
[45] Oct. 9, 1973

[54] TRANSFER ARM FOR BLOW MOLDING APPARATUS

[75] Inventors: LeRoy L. Mauger, Douglassville, Pa.; Robert W. Gilbert, Havertown, Pa.

[73] Assignee: Beloit Corporation, Beloit, Wis.

[22] Filed: Nov. 29, 1971

[21] Appl. No.: 202,864

[52] U.S. Cl.............. 425/135, 425/139, 425/161, 425/DIG. 212, 425/DIG. 216
[51] Int. Cl............................................. B29d 23/03
[58] Field of Search.................... 425/139, 135, 145, 425/150, 155, 161, 324 B, 387 B; 18/5 BT

[56] References Cited
UNITED STATES PATENTS

| | | | |
|---|---|---|---|
| 3,212,130 | 10/1965 | Elphee | 425/324 B X |
| 3,566,441 | 3/1971 | Thorn et al. | 425/387 B X |
| 3,474,759 | 10/1969 | Barfred | 425/161 X |
| 3,526,690 | 9/1970 | Bachman | 425/150 X |

*Primary Examiner*—H. A. Kilby, Jr.
*Attorney*—Roberts B. Larson et al.

[57] ABSTRACT

A transfer arm for a blow molding apparatus of the type in which a cold parison is heated in an oven, and then picked up out of the oven by a transfer arm and carried to a blow molding station at which its bottom is held while the parison is stretched upwardly, and after which the mold closes onto the parison to form a container out of the stretched parison, and after which the transfer arm returns to the oven to pick up another heated parison. In moving through its cycle, the transfer arm is moved vertically to lift and lower the parisons and pivoted about an axis to move between the oven and the molding station. A main double acting piston and cylinder effects vertical movement of the transfer arm. A limit switch associated with the transfer arm limits upward movement thereof at an intermediate height for stretching the parison.

9 Claims, 12 Drawing Figures

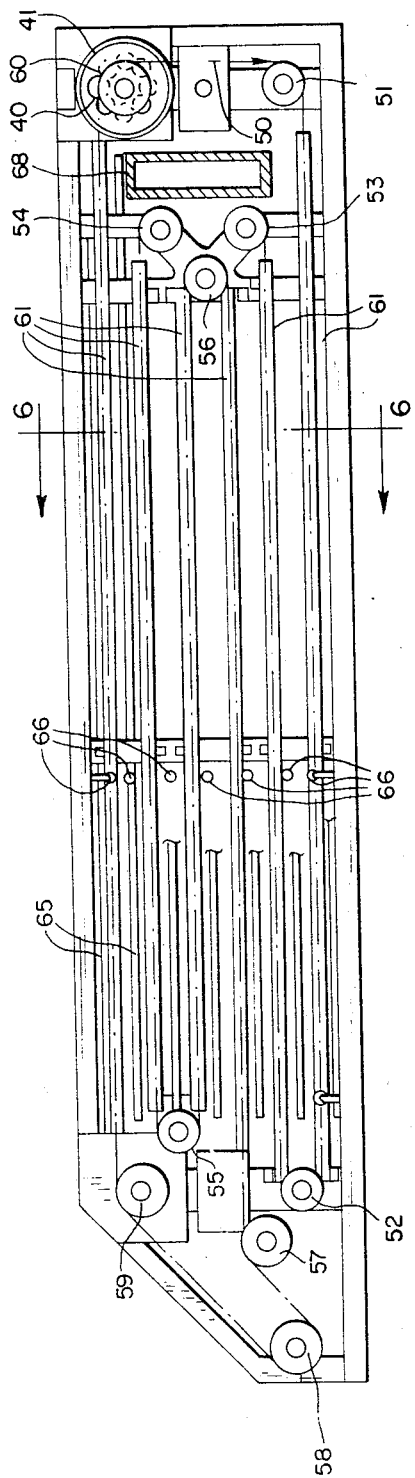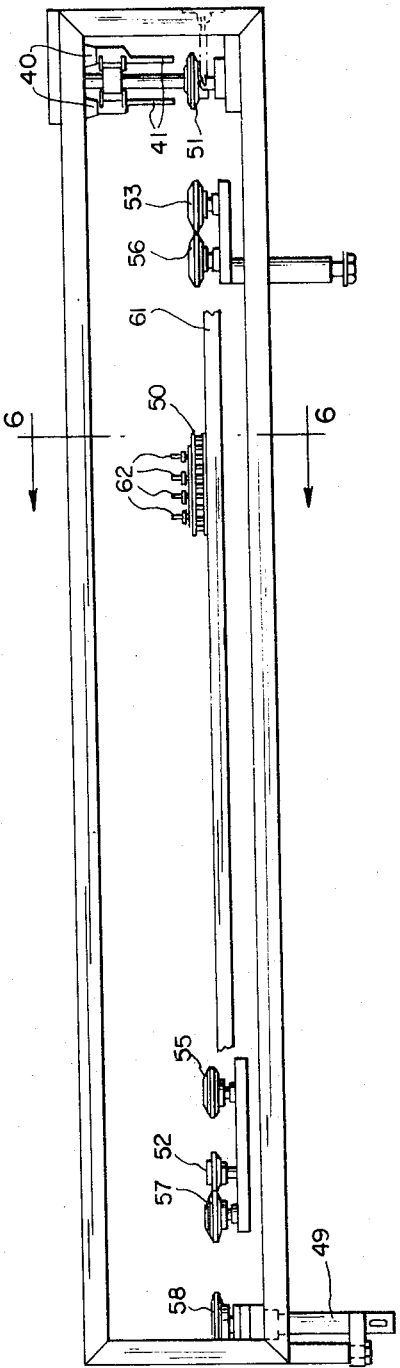
FIG. 3
FIG. 4

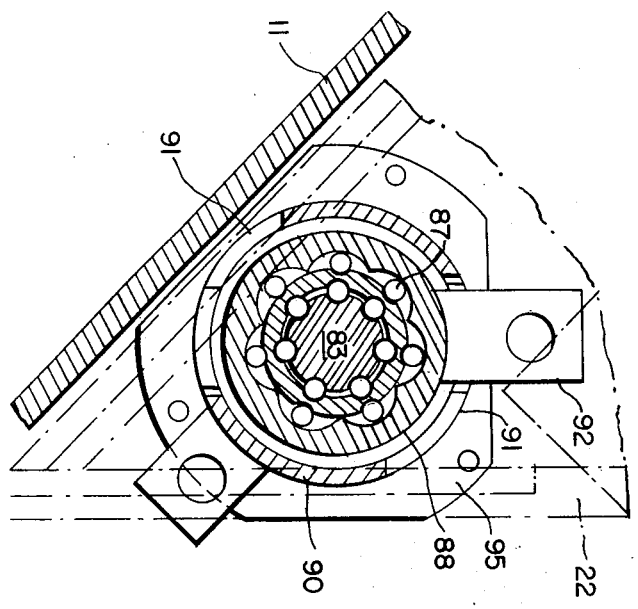
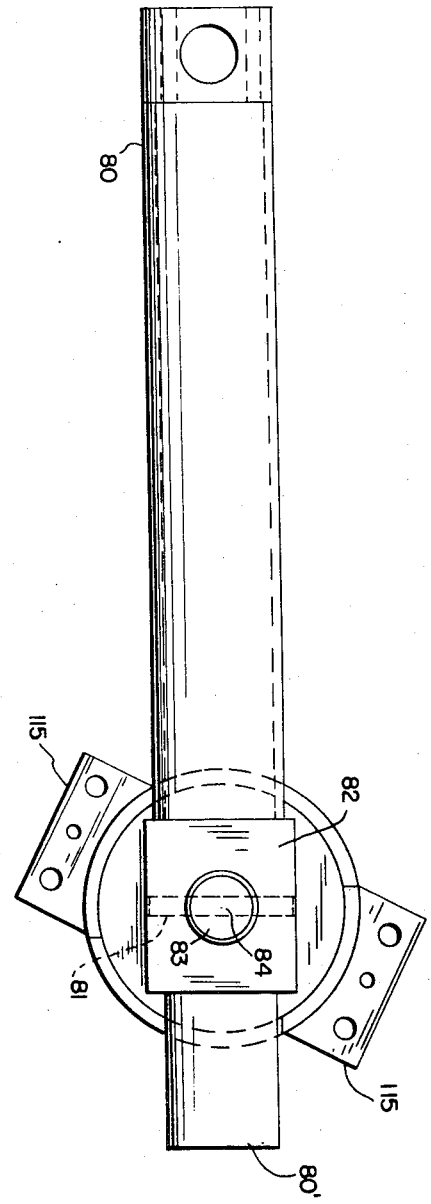
FIG. 8
FIG. 9

TRANSFER ARM FOR BLOW MOLDING APPARATUS

RELATED APPLICATION

This application is an improvement of the commonly owned U.S. application Ser. No. 3003, filed Jan. 15, 1970 now abandoned for continuation as S.N. 276,071 by Lawrence A. Moore, for "BLOW MOLDING METHOD AND APPARATUS," the specification and drawings of which application are expressly incorporated by reference herein.

BACKGROUND OF THE INVENTION

The said previous commonly owned application Ser. No. 3003 discusses the background leading up to the method and apparatus disclosed and claimed therein relating to a method and apparatus for heating and blow molding cold partisons to form containers.

In the preferred arrangement of said application Ser. No. 3003, the parisons are first fed into and conveyed through an oven arranged that when a given parison has reached the proper forming temperature, it arrives at a discharge station. The mold is located at a mold station adjacent the oven in the vicinity of the said discharge station thereof. A thread forming means is mounted at one end of the mold and is adapted to engage the lower end of a heated parison to form the neck and the threads of the bottle therefrom and to hold that end of the parison as the other end is moved during a stretching procedure immediately prior to the closing of the mold which is of course followed by the injection of pressurized air into the bottle while the mold is closed to shape the bottle therein. After the bottle has been formed, the mold is opened and the finished bottle is removed.

A feature of application Ser. No. 3003 includes means for handling the parison between the discharge station of the oven and the molding station. This means comprises a transfer assembly which includes a generally vertical post attached to the base of the apparatus, a generally horizontal transfer arm extending outwardly from the post and a generally vertical picker arm extending downwardly from the outer end of the transfer arm. The picker arm includes jaws for engaging and holding parisons. The transfer arm-picker arm assembly is movable horizontally preferably for being turned in a curved path, and also vertically.

In the operation of the apparatus of application Ser. No. 3003, the transfer arm-picker arm assembly is lowered into the oven at the discharge station such that the picker arm jaws grab the top of a properly heated parison. The transfer arm-picker arm assembly then rises out of the oven to an upper height and pivots about a vertical axis until it reaches a point over the blow molding station whereat the parison is lowered such that the lower end of the parison may be engaged by the said thread forming means of the blow mold. The parison will continue to be held at its lower end as the transfer arm-picker arm assembly, while still holding the upper end of the parison, moves upwardly to an intermediate height to stretch the parison. After stretching, the mold is closed and air is injected through the said opening of the bottle to shape the bottle within the mold. As the bottle is being formed in the mold, the transfer arm-picker arm assembly rises again to said upper height and swings back to its original position over the discharge station of the oven, dropping the scrap upper portion of the parison enroute.

With this arrangement, cycle time for a given molding station may be substantiallly reduced since wasted motion is substantially reduced, if not eliminated. For example, time may be reduced to a few seconds per bottle because of the interrelationship of the various parts of the apparatus. For example, while the mold is closed, the transfer arm-picker arm assembly can discharge the upper scrap end of the parison, pick up a new parison and swing this new parison over to a point just adjacent to the mold. Only a short time would be required during the mold open position merely to eject the finished bottle, lower the new parison to the threading and holding means and to stretch the parison by raising the transfer arm-picker arm assembly.

In the above described arrangement of application Ser. No. 3003, a main hydraulic piston and cylinder unit is provided for raising and lowering the transfer arm and a pneumatically vertically adjustable stop nut is provided for limiting upward movement of the transfer arm during the step of stretching the heated parisons. The vertical postion of this stop nut must be varied during the transfer arm cycle. It must be raised during certain times to permit movement of the transfer arm to the said upper level and then lowered at a specific time to limit upward movement of the transfer arm during the stretching step.

However, it has been found that this penumatically operable vertically adjustable stop nut arrangement for controlling the vertical position of the transfer arm during stretching is subject to certain disadvantages. The controls thereof tended to be relatively complicated, the pneumatically operable unit tended to require much maintenance, and it was quite noisy in operation. In addition, since this unit is positioned uppermost in the machine, it tended to increase the overall height of the equipment of about 20 inches.

Thus, there exists a need for improving the means in a blow molding apparatus of the type described in U.S. application Ser. No. 3003 for controlling upward movement of the transfer arm during stretching of the parisons.

SUMMARY OF THE INVENTION

Thus, it is a purpose of the present invention to provide a new and improved transfer arm arrangement in a blow molding apparatus of the type described which overcomes the disadvantages of previous transfer arm arrangements.

This purpose of the present invention is achieved by reconstructing the control means of the transfer arm in the arrangement of application Ser. No. 3003 in such a manner that the vertically adjustable pneumatically operable stop nut may be completely eliminated. In lieu thereof, upward movement of the transfer arm during the parison stretching step is terminated at an intermediate height by simply cutting off the flow of pressurized fluid provided for raising and lowering the transfer arm. A limiting switch operable in response to upward movement of the transfer arm to said predetermined height is utilized to effect said cutting off.

In accordance with a preferred arrangement of the present invention, a limit switch is fixedly mounted on the exterior of the transfer arm assembly casing surrounding the vertical axis thereof and positioned to be engaged by a cam member connected to the transfer arm when the latter carries a parison positioned at the mold station. At this station the transfer arm is lowered down between the mold halves to position the bottom of the parison, as described above, after which the transfer arm rises to an intermediate height during the stretching step after which the mold halves close and after which the transfer arm rises to its upper height before swining back to the oven to pick up another parison. The picker arm of the transfer arm is actually located between the mold halves while it is lowering the parison and before the termination of the stretching step. Therefore, a limit switch is provided to be activated whenever the picker arm is between the mold halves to prevent the closing of the mold halves during this time. This same limit switch may be so constructed such that just at the completion of the stretching step it could close an electrical circuit to operate a solinoid operated valve to stop the flow of hydraulic fluid which would otherwise raise the transfer arm. A suitable means including a timer may then be provided for opening this piston circuit after a predetermined time to permit the main piston and cylinder unit to continue raising the transfer arm to its upper position.

Thus, it is an object of this invention to provide a new and improved transfer arm in a blow molding apparatus of the type described which overcomes the disadvantages of the previous transfer arm arrangement.

It is another object of this invention to provide a new and improved transfer arm assembly in a blow molding apparatus of the type described which assembly includes a simplified, economical and convenient arrangement for limiting upward movement of the transfer arm at the termination of parison stretching.

It is another object of the present invention to provide a new and improved transfer arm assembly in a blow molding apparatus of the type described in which a main piston and cylinder unit controls vertical movement of the transfer arm assembly and in which the termination of upward movement of the transfer arm assembly at an intermediate height when stretching the parison is effected by means of a limit switch operable in response to vertical movement of the transfer arm assembly to said intermediate height, said limit switch operating a flow stop valve to terminate the flow of pressurized fluid to the main piston and cylinder unit.

It is another object of this invention to provide a new and improved transfer arm assembly in a blow molding apparatus of the type described in which a main piston and cylinder unit causes vertical movement of the transfer arm assembly and in which upward movement to an intermediate height of the transfer arm assembly is limited by a limit switch operable in response to upward movement of the transfer arm assembly to said intermediate height, said limit switch operating to terminate the flow of pressurized fluid to the main piston and cylinder unit by closing an electrical circuit to actuate a flow stop valve which prevents the flow of pressurized fluid into and out of the main piston and cylinder unit and hence momentarily prevents the transfer arm from rising until said electrical circuit is again opened.

Other objects and other advantages of the present invention will become apparent from the detail description to follow, together with the accompanying drawings.

BRIEF DESCRIPTION OF THE DRAWINGS

There follows a detailed description of a preferred embodiment of the invention to be read together with the accompanying drawings.

FIG. 3 is an enlarged plan view of an oven, which view is similar to FIG. 2 but with the top of the oven removed.

FIG. 4 is an enlarged side view of the oven, which view is similar to FIG. 1 but wherein the side plate has been removed.

FIG. 8 is a sectional view taken along line 8—8 of FIG. 7.

FIG. 9 is a sectional view taken along line 9—9 of FIG. 7.

DETAILED DESCRIPTION OF THE PREFERRED EMBODIMENT:

Referring now to the figures, like elements are represented by like numerals throughout the several views.

FIG. 1 through 9 illustrate the blow molding arrangement as described in the said previous application Ser. No. 3003.

Figure 1:
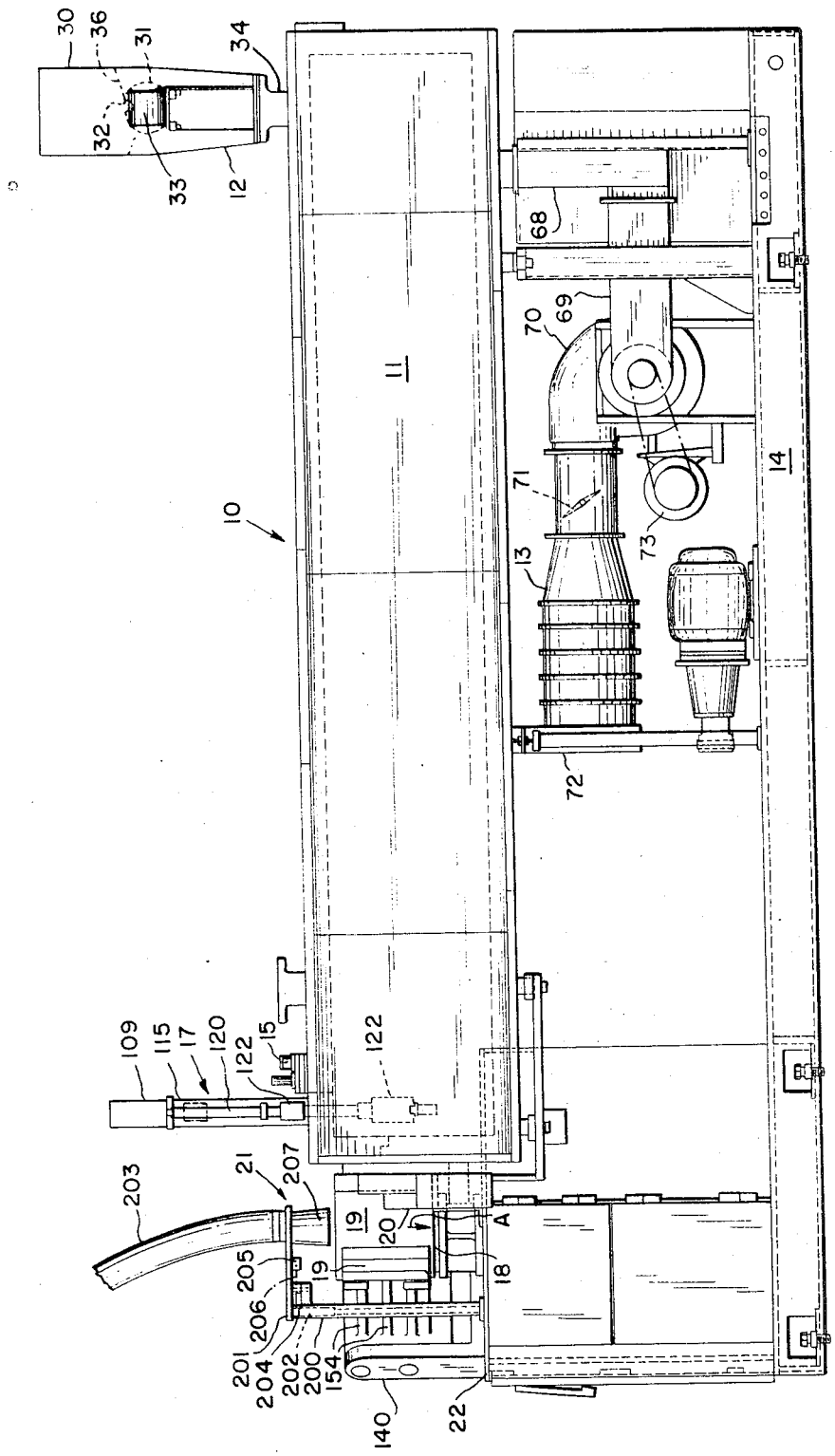
FIG. 1 is an elevation view of a parison treatment assembly as described in the said previous application Ser. No. 3003.
Figure 2:
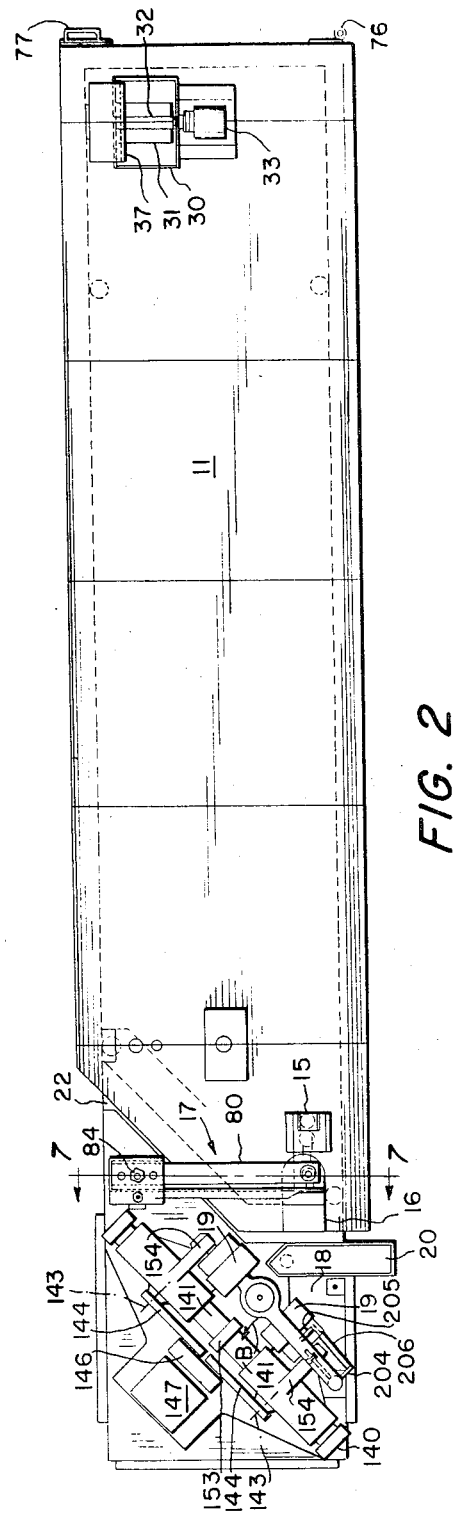
FIG. 2 is a plan view of a parison treatment assembly as shown in FIG. 1.
Figure 6:
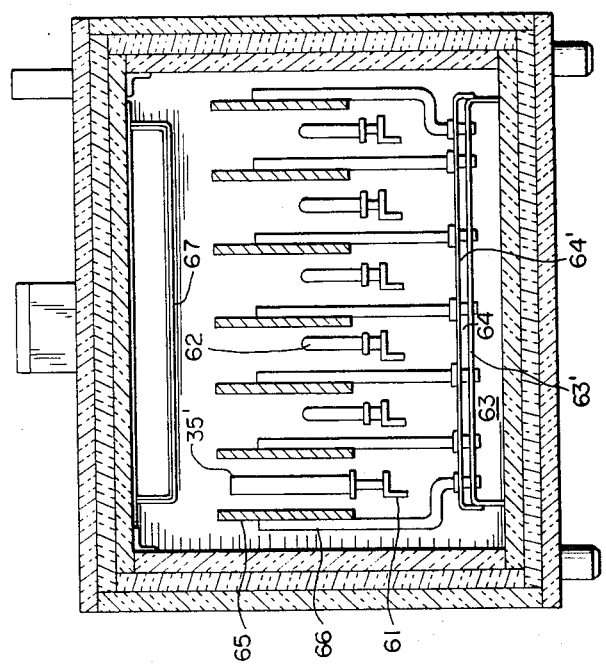
FIG. 6 is a cross-sectional view of the oven taken along line 7—7 of FIGS. 3 and 4.
Figure 5:
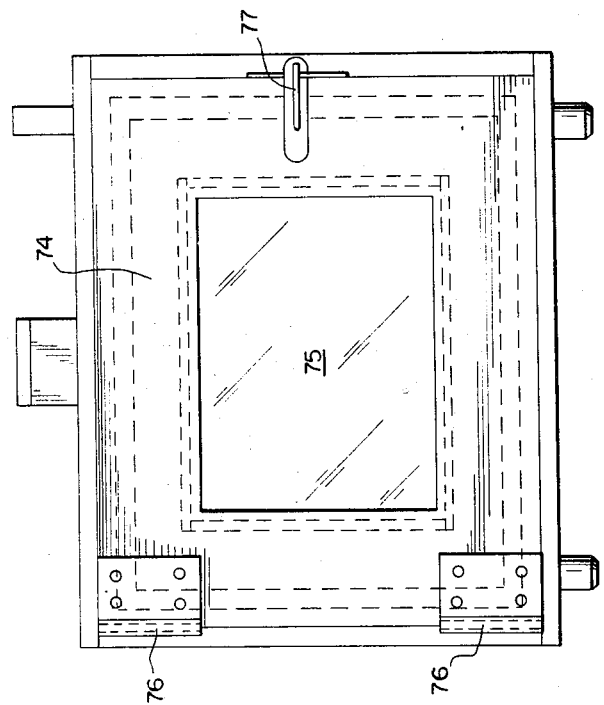
FIG. 5 is an enlarged end elevation view of the oven as viewed from the righthand side of FIG. 1.

FIGS. 1 and 2 illustrate the overall apparatus. A parison treatment apparatus 10 comprises a horizontally elongated oven 11 including a parison feeder 12 at one end thereof for feeding tubular parisons into the oven. Hot air is transmitted to the oven through electric heater 13.

The entire apparatus including the oven, the heater and all other elements are mounted above the floor on a steel base structure 14.

At the end of the oven opposite from the feeder 12, there is provided a discharge station including an opening 16 formed in the top of the oven. A transfer arm-picker arm assembly 17 is located in the vicinity of this discharge opening 16 and is adapted to enter the oven to grasp and remove a heated parison and to move upwardly to an upper height and then horizontally about a vertical axis above opposing halves 19 of a mold. Located just beneath the space between the two mold halves 19 is a threading and holding assembly 18. The assembly 17 lowers the parison between the open mold halves 19 until the lower end of the parison is grasped and held by the assembly 18. The transfer arm and picker arm assembly 17 then rises upwardly to an intermediate height, stopped by a stop nut 110, stretching the parison after which the mold halves 19 close. The assembly 17 then rises to said upper height and moves back to its original position over the opening 16, meanwhile dropping the scrap upper piece of the parison into the chute 20. After the container has been formed in the mold, the mold halves 19 separate and the finished container is removed through discharge tube 21.

The elements 17 through 21 are mounted on a raised base 22 which is located to the left of the oven 11 (as viewed in FIGS. 1 and 2).

The parison feeder 12 includes a generally rectangular hopper 30 having a bottom 36 for receiving tubular parisons 35. The bottom 36 is open at the middle. Below this bottom 36, and extending upwardly through the said middle opening, is a rotor 31 having a pair of elongated grooves 32, each groove of sufficient depth to receive a tubular parison therein. This rotor 31 is turned at a speed in time with the oven conveyor chain 50 by a right angle gear unit 33 for delivering parisons 35 to a vertical chute 34 curved such that a parison dropping down this chute turns 90° and becomes vertically oriented after which the parison is received in a vertical guide tube 40 which delivers the parison onto the conveyor in the oven 11. For further details of the feeder, refer to application Ser. No. 3003.

The purpose of the oven 11 is to heat the parisons slowly and uniformly. The parisons are received from the parison feeder 12 into the tube 40 (see the upper righthand corner of FIG. 4) from which they fall into one of the 271 pins carried by the conveyor chain 50. This chain 50 with the parisons traveling thereon moves by sprockets 51 through 58, respectively. The parisons are removed at the discharge station 16 which is located just above the sprocket 58. The empty pins then travel from sprocket 58 by sprocket 59 and sprocket 60 where they receive a new parison. Although not illustrated in the drawing, it will be appreciated that the parison feeder 12 could be provided above the sprocket 59 instead of the sprocket 60. This would permit each parison to remain in the oven a longer period of time, namely the time required to travel between the sprockets 59 and 60. However, this additional time is not always required, and hence on numerous occasions it is quite practical to have the feeder 12 located as shown in the drawings. However, this also illustrates the flexibility of the present invention.

A drive shaft 49, which may be operated by any suitable power means, turns the sprocket 58 to drive the chain conveyor 50. A system of chain tracks 62 extends through the oven and is visible in FIG. 3. A portion of the chain 50 is shown in detail in the middle of FIG. 4. Four of the 271 parisons pins 62 are shown here connected to the chain 50. All other parison pins are connected in the same manner. Also shown in FIG. 4 are the details of the guide tube 40. Actually, a pair of guide tubes 40 is provided on for rotation about a loading wheel 41.

As noted above, the oven is constructed in order to provide a steady and uniform flow of heated air through the oven. To accomplish this, the oven includes a main inlet duct 63 which receives the heated air from heater 13 and which extends the entire length of the oven. This duct is shown in cross-section in FIG. 6. The plate 63' which forms the top of duct 63 has a plurality of apertures therein. Immediately above the duct 63 is a second duct 64 which is much smaller in height then 63. The top of duct 64 is formed by a plate 64' which includes a plurlaity of apertures which are offset from the apertures in plate 63'. This provides a high pressure drop and prevents jets of air from flowing directly from the inlet duct 63 through to the oven space above the plate 64'. Thus, uniform heat distribution is assured, at least in part, by the high pressure drop of the incoming air through the plate 63'. Above these ducts 63 and 64 there is provided a set of vertical, preferably corrugated baffle plates 65 which extend for the full length of the oven and which are connected to the plates 63' and 64' by suitable rods 66. These plates assure even upward movement of the heated air and prevent cross-flow of the rising air between the rows of conveyor 50. The baffles also assure equal radiation from all directions as the parisons pass through the oven. In this way, the cold wall effect is eliminated. Spaced slightly above the plates 65 is an outlet duct 67 which also extends for the full length of the oven and which is visible in cross-section in FIG. 6. This duct is of course apertured on its bottom side for receiving the upwardly flowing air. From the duct 67 the air travels downwardly through the return duct 68 to the inlet duct 69 of the fan 70 which in turn is operated by a motor 73 for blowing the returned heated air by a air flow valve 71 through the air heater 13 and then through a duct 72 to the said inlet duct 63. For viewing and inspecting the inlet end of the oven there is provided a door 74 mounted on hinges 75 and having a handle 77. The door also includes a plexiglass viewing window 75.

Figure 7:
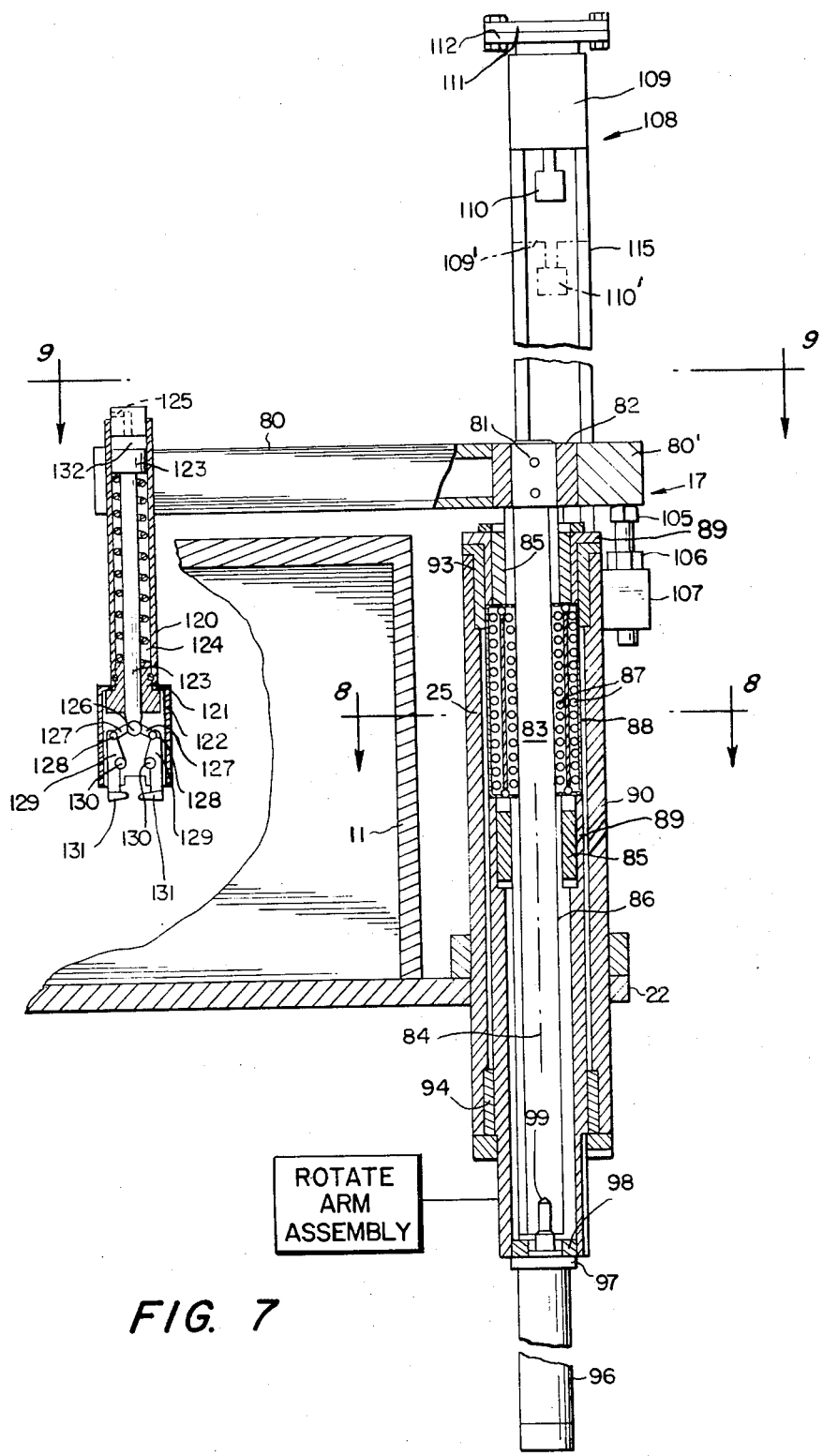
FIG. 7 illustrates the transfer arm-picker arm assembly as described in said application Ser. No. 3003 and is taken along line 7—7 of FIG. 2.

FIGS. 7 through 9 illustrate the transfer arm-picker arm assembly 17 of Application Serial No. 3003 in greater detail. This assembly includes a transfer arm 80 connected by pins 81 and a rectangular mounting block 82 to a spindle 83 which is turnable about its axis 84. The spindle 83 is also capable of sliding vertically parallel to its axis, and thereby raising and lowering its transfer arm 80. The spindle 83 is supported for sliding movement in bearings 85. Further, the spindle 83 is splined and includes grooves 86 running for the full lenght of the spindle. Rolling balls 87 of a ball bearing spline 88 extend into th grooves 86. Surrounding 88 and fixed thereto for movement therewith is a further tube 89. The elements 88 and 89, which are fixed together, are separated from an outer tube 90 by bearings 93 and 94. The outer tube 90 is fixed by means for mounting plate 95 to the raised main frame 22. However, 88 and 89 are turnable within this outer tube 90. Thus, it can be seen that any turning movement applied to the tube 89 will be applied through the ball bearing spline 88 and the balls 87 to the spindle 83, and this will be the case regardless of the vertical position of spindle 83 since the grooves 86 therein extend for the full length of the spindle 83. Referring to FIG. 9, it can be seen that the outer tube 90 includes a set of opposed openings 91 through which extend lugs 92 which are fixed to 88 and 89. Thus, by turning lug 91 and/or lug 93 about axis 84, one accomplishes turning movement of the spindle 83 and hence also of the transfer arm 80.

Vertical movement of this spindle 83 is carried out by means of a hydraulic cylinder 96 fixed to the lower end thereof. The hydraulic cylinder unit is conventional and thus is not shown in detail. It is sufficient to note that the element 96 is connected through the flange element 97 and the disc 98 and through the bolt 99 to the bottom of shaft 83 for movement therewith.

As is evident from FIG. 7, the spindle is shown in its lowermost position whereat the transfer arm 80 lies just above the top of the oven 11. At this point an extension 80' of the transfer arm 80 abuts an adjustable down stop bolt 105 which has a locking nut mounted thereon and which is supported by a bracket 107 which is in turn fixed to the outer tube 90. Upward movement of the spindle 83, and hence also of the transfer arm 80 is limited by an up stop assembly 108 which is mounted on support columns 115 above the transfer arm 80. Specifically, upward movement of transfer arm 80 is limited by engagement with a stop nut 110. The vertical position of this stop nut 110 must be changed to different positions during normal operation of each cycle of the apparatus to stop the upward movement of the transfer arm at different heights. Therefore, assembly 108 includes a vertically movable pneumatic cylinder 109 slidable relative to a piston 111 which is in turn connected through a flange element 112 by means of nuts and bolts to the support columns 115. Stop nut 110 is fixed to cylinder 109 for movement therewith. A lowered position of 109' and 110' is shown in dotted lines in FIG. 7. Movement of the pneumatic cylinder 109 will be synchronized with the other elements of the overall apparatus so that the element 110 assumes the correct position during the various stages of the cycle.

Also shown in FIG. 7 is the picker arm which includes an outer housing 120 which is fixed with respect to the transfer arm 80 and includes at the lower end thereof a bearing 121 fixed to the housing 120. The housing includes an enlarged lower portion 122. A central piston 123 extends for the full length of the housing 120 and includes an enlarged heat at its upper end which extends across the entire cross-section of the interior of housing 120. A spring 124 urges the head of 123 upwardly while downward movement thereof is provided by pneumatic fluid entering a passageway 125 in a head member fixed to the housing 120.

At its lower end, piston 123 is connected by a pivot connection 126 to a pair of upper links 127 which are in turn connected at pivot connections 128 to lower links 129. These lower links are turned about pivot pins 130 which are connected to the housing portion 122 and these lower links 129 include at their lower ends picker jaws 131 which may be moved inwardly and outwardly with respect to each other. Thus, it can be seen downward movement of 123 will cause the jaws 131 to move towards each other to grasp and hold an element such as a parison located therebetween. Similarly, upward movement of the element 123, which will occur when the pressure is released from line 125 and the spring 124 urges the element 123 upwardly, will cause the jaws 131 to separate from each other.

For details of the means for opening and closing the mold halves 19 and for the assembly which holds the bottom of the parisons and forms the threads, reference is made to FIGS. 11 through 15 of said application Ser. No. 3003.

The operation of apparatus of FIGS. 1 through 9 is as follows: Assuming that it is desired to convert tubular parisons 35 into bottles 159, the parisons are first stacked neatly in the hopper 30 of the feeding device 12 with the assistance of plate 37. These parisons are fed by means of grooves 32 in the rotor 31. In the oven 11, the parisons are received on pins 62, on which they travel along conveyor 50 through the baffle system becoming uniformly heated. The importance of uniform heating of the parisons cannot be overemphasized. If the parison is not heated to the same temperature uniformly along its length, then it will not be stretched uniformly at a later point in the operation and hence the resultant bottle 159 may be defective in that it may vary in thickness by an unacceptable amount of one end to the other. Although the conveyor 50 could possibly be indexed, in a preferred embodiment of the invention it moves continually through its illustrated path. To compensate for this, the transfer arm-picker arm assembly 17 is constructed so that when the lower end of the picker arm extends into the opening 16 at the discharge station, it moves slightly in its curved path about axis 84 as the jaws 31 grip a parison.

As soon as a parison has been firmly grasped by jaws 131, the cylinder 96 is actuated to raise the spindle 83 thereby raising the picker arm and the parison being grasped thereby to an upper height. At first the picker arm stops whereat the first parison is gripped by cooling fingers 15 (which are not shown in detail in the present drawings) which simply cool the parison locally to a uniform but slightly lower temperature. Suitable mechanical means, not shown, then actuate the lugs 92 to turn the tubular elements 88 and 89, and hence also the spindle 83 and the transfer arm 80 until the parison is directly over the plug 180 and the space between the open, that is spaced apart arms of the threading assembly. As explained above, this movement of the transfer arm 80 mechanically assures that the ejection tube 203 has been moved outwardly away from its position over the threading means 18.

At this time, the cylinder 96 is again actuated to lower the spindle 83 until the bottom of the parison being held by the jaws 131 abuts the thread dies. The arms of the thread die are then closed into the lower end of the parison, which is firmly held thereby. The transfer arm is then raised to an intermediate height to stretch the parison. During this stretching procedure, the jaws 131 do not rise to their maximum upper height at which they were located when they carried the parison from the oven to the area of the mold. Thus, the upward movement of the arm 80 and hence the picker arm and the jaws 131 must be limited. For this purpose the stop nut 110 shown in FIG. 7 is lowered as the stretching procedure takes place. Thus, upward movement of the jaws 131 during stretching is limited by engagement of the arm 80 with the stop nut 110 in its lowered position 110' as shown in FIG. 7.

After the parisons have been stretched, the two mold halves are closed. At a height as corresponding to what will be the bottom of the bottle, the parison is cut and sealed closed by the mold. At this point two events occur concurrently. First, the stop nut 110 is raised to its uppermost position permitting maximum rise of the transfer arm-picker arm assembly to its upper height so that the scrap portion of the parison, that is the portion above the cut, is moved upwardly above the mold. The arm 80 then swings counterclockwise (as viewed in FIG. 2) as the transfer arm again returns to its position over the discharge opening 16 of the oven 11. However, en route to this position the transfer arm 80 moves over the chute 20 whereat the jaws 131 are separated so that the scrap portion is permitted to run down the chute 20 into a suitable recepticle. The transfer arm 80 then continues its travel to the oven to grasp another parison after which it commences its return to the mold. Meanwhile, concurrently with the above described movement of the arm 80, air under pressure is introduced into the closed portion of the parison remaining in the mold. Of course in a conventional manner the faces of mold halves are of the shape of the bottle to be formed so that the air under pressure causes the hot parison to move against the walls of the cavities formed in the mold halves forming and shaping the bottle. Meanwhile, since the transfer arm 80 has moved back to its position over the oven 11, the arm 201 has been permitted, under the influence of its spring 206, to move back to the position over the mold halves 19. The mold halves are now separated and the bottom of the parison is released. Air is again introduced into the bottle. However, this time since the mold is open and the bottom of the bottle released, this air causes the bottle to be thrown upwardly whereat it is received in and carried away through the tube 203.

As explained above, the various components of the assembly cooperate with each other by operating in synchronism with each other to carry out the purposes of the invention. This may be carried out, for example, by operating all of the various valves which control the flow of pressure fluid to the various components by means of a common rotary switch having a plurality of cams mounted thereon, each cam controlling a different valve and/or a different component of the assembly. For example, one cam on the rotary switch may be provided for each of the following: (a) hydraulic cylinder 96 for raising and lowering the spindle 83, (b) a further hydraulic device for turning the spindle 83, (c) fluid through line 25 to the space 132 for controlling the jaws 131, (d) the pneumatic cylinder 109, (e) the rotary unit for opening and closing the threaded parison holder, and (f) the rotary unit for opening and closing the mold halves. Turning of the arm 201 may also be controlled off of this same rotary switch. However, in the preferred embodiment, this member is simply connected directly and mechanically to the transfer arm to be moved in response to rotary movement thereof.

Figure 10:
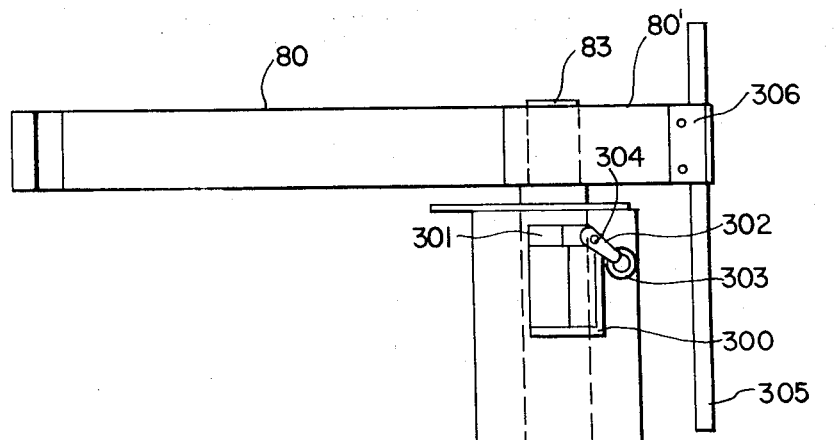
FIG. 10 is a side elevational view of the new and improved transfer arm assembly constructed in accordance with the present invention.
Figure 10:
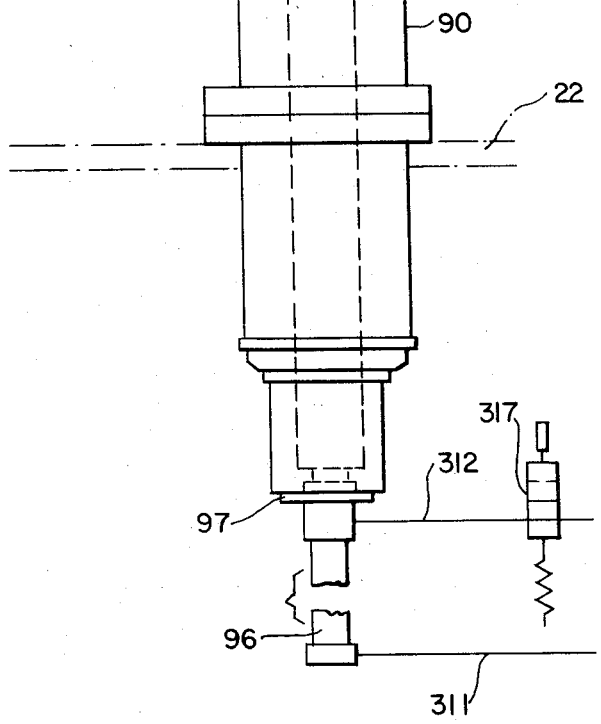
Figure 12:
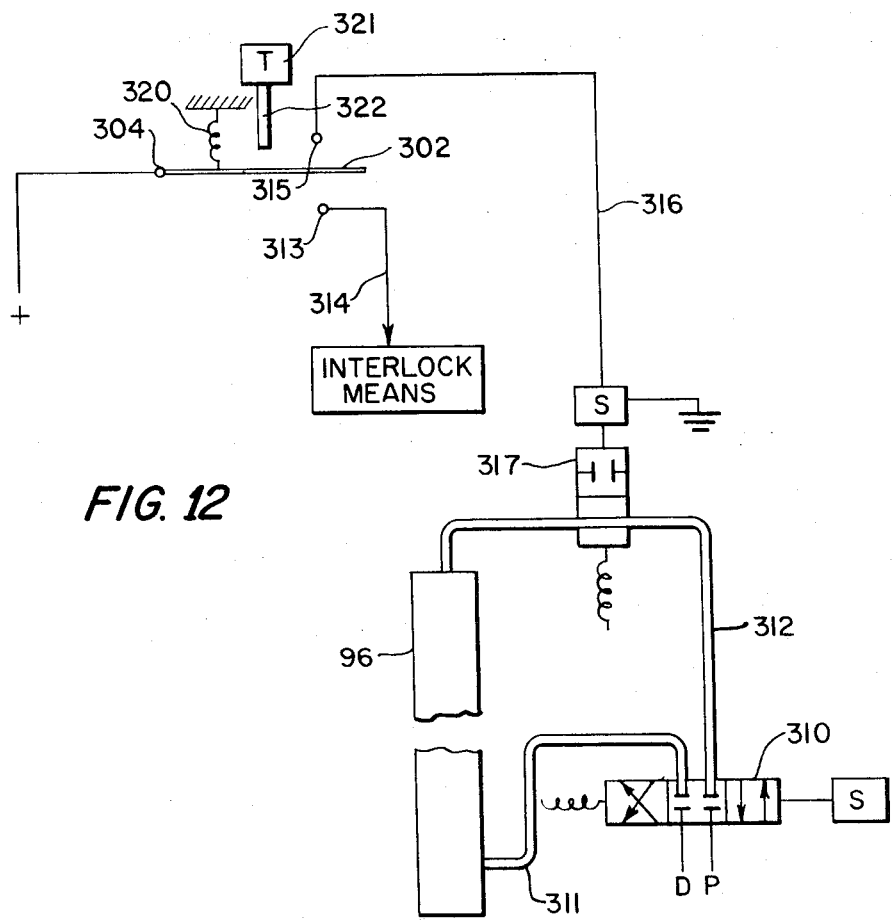
FIG. 12 is a schematic view illustrating the operation of the present invention.
Figure 11:
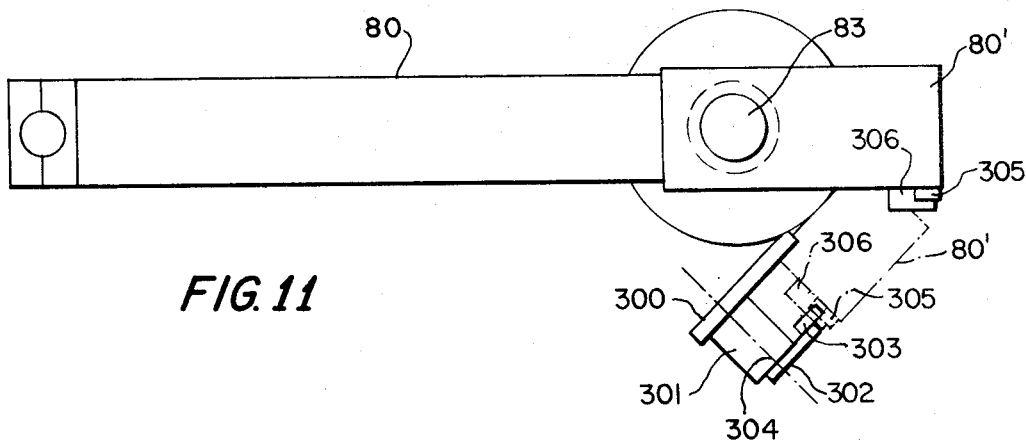
FIG. 11 is a plan view of the transfer arm assembly of FIG. 10.

FIGS. 10–12 illustrate the new and improved transfer arm of the present invention.

A mounting plate 300 is attached to the outer tube 90 of the transfer arm and has fixed thereto a limit switch 301 which has a switch lever 302 mounted thereon for rotation about an axis 304. A switch cam 303 is located at the outer end of the switch lever 302. The part 80' of the transfer arm 80 has a clamp 306 holding a bar cam 305. FIG. 11 illustrates in dotted lines the position of the parts 80', 305 and 306 when the transfer arm 80 is turned 45° such that the picker arm is at the mold station. In this case, downward movement of the bar cam 305 engages the switch cam 303 turning the lever 302 about axis 304. The lever 302 remains in this position whenever the bottom of bar cam 305 is below the level of the lever 302. In this case the side of bar cam 305 actually engages the switch 303 and holds it down.

FIG. 12 illustrates the circuitry associated with the limit switch and also the basic hydraulic circuitry associated with the double acting cylinder 96. Two fluid lines 311 and 312 lead from the bottom and top of the cylinder 96 to a valve 310 which has three positions as shown, one position for delivering pressurized fluid to the bottom of cylinder 96 while draining pressurized fluid from the top thereof to raise the spindle 83 and hence the transfer arm 80, a second position for feeding pressurized fluid through line 312 to the top of cylinder 96 while draining pressurized fluid from the bottom thereof through line 311 to lower the transfer arm and a third position for stopping the flow of pressurized fluid through lines 311 and 312 to hold the transfer arm at any selected vertical level.

Also shown in FIG. 12 is a flow stop valve 317. The normal position of this valve is as shown in the drawings, i.e., permitting fluid to flow through line 312.

Still referring to FIG. 12, the switch lever 302 has three positions including a rest position as shown in FIG. 12, an interlock position at which the lever 302 would close a circuit with a contact 313 and a stretch stop position at which the lever 302 would close a circuit with contact 315. Also shown in FIG. 12 is a spring 320 which is of such a strength that it does not urge the lever 302 from its rest position into contact with the contact 315, but when the lever 302 is held against the contact 313, it exerts a sufficient force on this lever such that when the lever 302 is released from the contact 313, the spring 20 will exert a force on the lever giving it sufficient momentum to swing into contact with 315. Means will be provided for holding this lever into contact with 315 (any suitable means such as a snap catch, a magnet, etc.) until the lever is urged back to its rest position by the rod 322 operating in response to a timer 321.

The operation of the blow molding apparatus is essentially the same as described above with respect to FIGS. 1 through 9 with the following changes attributable to the elements described in FIGS. 10 through 12. When the transfer arm is swung over to the mold station and starts to move downwardly thereat, at a moment before the lower ends of the picker arm moves between the mold halves 19, the bar cam 305 engages the switch cam 303 urging the lever 302 downwardly such that a circuit is closed with contact 313. This circuit remains closed by engagement of the side of bar cam 305 with the switch cam 303 for the entire time that the picker arm is between the mold halves. This contact 313 leads to an interlock circuit 314 known per se which will therefore prevent closing of the mold halves while this circuit is closed, that is while the picker arm is down between the mold halves. After the parison has been grasped below the mold in the manner described above and in application No. 3003, the transfer arm rises for the stretching operation. At the precise moment when the intermediate height has been reached whereat the picker arm is above the mold halves and it is desired to stop upward movement of the picker arm and close the mold, the bottom of bar cam 305 passes above the switch cam 303 thereby releasing it. Spring 320 then urges lever 302 into contact with 315 thereby closing a circuit through line 16 operating a solenoid valve 317 which then moves downwardly to stop the flow of hydraulic fluid through line 312. Although the valve 310 is still in position to deliver hydraulic fluid through line 311 and receive fluid through line 312 to be drained, the valve 317 is of sufficient strength to prevent all such flow from occurring. The valve 317 is held in the flow stop position as long as the circuit is closed through line 316. This may be on the order of one second. After this time period has elapsed, the timer 321 will activate a suitable means such as rod 322 to urge the lever 302 to its rest position breaking the contact with line 316 whereby the spring actuated flow stop valve 317 will return to its normal position at which flow can continue through the line 312 and hence the transfer arm 80 can continue to move upwardly to its upper position. After this the transfer arm swings back to the oven in the manner described with respect to FIGS. 1 through 9.

Although the invention has been described in considerable detail with respect to a preferred embodiment, it will be apparent that the invention is capable of numerous modifications and variations apparent to those skilled in the art without departing from the spirit and scope of the invention.

We claim:

1. A blow molding apparatus comprising: an oven for heating parisons, a mold for forming stretched parisons into containers, a transfer arm having a picker means for holding the upper part of a parison, a pressurized piston and cylinder means for moving the transfer arm vertically, a mold station, means at the mold station for grasping the bottom of a parison; said transfer arm including means for moving it vertically and also horizontally about a vertical axis for raising the parison from the oven to an upper level, moving it horizontally to the mold station and lowering it at the mold station whereat the parison is grasped at its bottom, and then raising the transfer arm while the picker still holds the top of the parison to stretch the parison, and means responsive to the upward movement of the transfer arm during stretching to an intermediate height at which the picker means is above the mold for stopping the flow of pressurized fluid to the said piston and cylinder means to stop upward movement of the transfer arm.

2. An apparatus according to claim 1, said piston and cylinder means being a double acting piston and cylinder means movable in one direction to raise the transfer arm and in the opposite direction to lower the transfer arm, main valve means for controlling the flow of hydraulic fluid to and from the said double acting piston and cylinder means, and a flow stop means in addition to said main valve means for controlling the flow of pressurized fluid through at least one of said fluid lines, and said means responsive to the movement of the transfer arm being electrical switch, an electrical line connected to be closed by said switch for operating said flow stop valve to stop the flow of fluid through said fluid lines.

3. An apparatus according to claim 2, said electrical switch comprising a limit switch mounted on a fixed part of the transfer arm apparatus, a cam means movable vertically with the transfer arm, said cam means operating said switch upon upward movement of the transfer arm.

4. An apparatus according to claim 2, wherein the said means responsive to the movement of the transfer arm includes means for holding the flow stop valve closed only momentarily and then releasing the same after a predetermined time whereby the transfer arm continues its upward movement.

5. An apparatus according to claim 2, including an interlock means for preventing the mold from closing when the picker arm is between the halves of the mold.

6. The apparatus of claim 5 wherein said switching means comprises a limit switch mounted on a fixed part of the blow molding apparatus and a bar cam mounted on the movable part of the transfer arm, said switch having two positions, said bar cam moving said switch to a first position to operate the interlock whenever the picker arm is lowered between the mold halves, and said bar cam releasing the limit switch and means for causing the limit switch to move to the second position when released from the first position, said switch in the second position closing said electrical line to the flow stop valve .

7. An apparatus according to claim 6 including a spring for urging the switch to the second position when released from the first position and a means for subsequently returning the switch to a rest position other than said first and second positions.

8. An apparatus according to claim 1, including an interlock means for preventing the mold halves from closing when the picker arm is down between the mold halves and wherein said means responsive to movement of the transfer arm comprises a switch movable between two positions, a first position to operate the interlock and a second position to stop the flow of pressurized fluid to the said piston and cylinder means.

9. An apparatus according to claim 1, including means for restarting the flow of pressurized fluid to the said piston and cylinder unit after a predetermined delay to permit the transfer arm to continue to move upward from said intermediate height to a further height thereabove.

* * * * *

PO-1050
(5/69)

UNITED STATES PATENT OFFICE
CERTIFICATE OF CORRECTION

Patent No. 3,764,246          Dated   October 9, 1973

Inventor(s)  Leroy L. Mauger and Robert W. Gilbert

It is certified that error appears in the above-identified patent and that said Letters Patent are hereby corrected as shown below:

Column 6, Line 55, "Figure 9" should read -- Figure 8 --;

Line 57, between "lugs 92" and "which", please insert -- (one of which is shown) --;

Line 58, please delete "88 and";

Line 58 and 59, please delete "and/or lug 93".

Signed and sealed this 17th day of September 1974.

(SEAL)
Attest:

McCOY M. GIBSON JR.
Attesting Officer

C. MARSHALL DANN
Commissioner of Patents